United States Patent [19]

Schlegel

[11] 3,726,498
[45] Apr. 10, 1973

[54] PENDANT SUPPORTING AND RETAINING DEVICE FOR ARRESTING AIRCRAFT

[75] Inventor: William R. Schlegel, Colonial Woods, Del.

[73] Assignee: All American Industries, Inc., Wilmington, Del.

[22] Filed: Nov. 23, 1971

[21] Appl. No.: 201,350

[52] U.S. Cl. ............................................244/110 C
[51] Int. Cl. ................................................B64f 1/02
[58] Field of Search.................................244/110, 63

[56] References Cited

UNITED STATES PATENTS

| | | | |
|---|---|---|---|
| 2,844,340 | 7/1958 | Daniels et al. | 244/110 C |
| 3,146,974 | 9/1964 | Petoia | 244/110 C |
| 3,167,277 | 1/1965 | Cotton | 244/110 C |
| 3,428,275 | 2/1969 | Condadina et al. | 244/110 C |

Primary Examiner—Milton Buchler
Assistant Examiner—Paul E. Sauberer
Attorney—Arthur G. Connolly et al.

[57] ABSTRACT

The cross runway pendant of an aircraft arresting system is supported and retained above the runway at a height suitable for aircraft hook engagement on spaced disengageable, elevating, gripping tong assemblies by the upward reaction of a resilient support accommodated within slots in the runway. The pendant is disengageably retained between flexible jaws on each assembly from which it is snatched upon engagement by a landing aircraft. The upward bias of the resilient support is overridden by actuating a compressed air cylinder to depress the assembly and cause it to release the pendant. A groove is installed across the runway under the pendant to permit full retraction of the pendant below the surface, and the part of the runway under the pendant may be made of a wear-resistant material such as polyurethane, having a low coefficient of restitution for helping to damp waves set up in the pendant when it is run over by unarrested aircraft wheels and for protecting the surface of the runway against resultant chipping and spalling.

30 Claims, 18 Drawing Figures

PENDANT SUPPORTING AND RETAINING DEVICE FOR ARRESTING AIRCRAFT

BACKGROUND OF THE INVENTION

Various devices have been proposed for holding the pendant of an aircraft arresting system a short distance above the runway for engagement by the hook of a landing aircraft — as described in U. S. Pat. Nos. 2,844,340, 3,158,341 and 3,410,509. These supported pendants are, however, subject to troublesome wave motion and vibration when they are run over by normal aircraft traffic, which tends to chip and spall the concrete runway. An object of this invention is to provide a pendant support and retainer which better tolerates pendant impact, damps and subdues wave motion and vibration which may damage protruding aircraft appendages and which automatically reengages after payout and retrieval.

SUMMARY

A cross runway pendant for an aircraft arresting device is disengageably held at an arresting height above the runway in spaced gripping tong assemblies which are upwardly biased by resilient supports installed in slots for movement from above to below the surface of the runway. Each assembly has flexible resilient jaws to allow the pendant to be snatched out from between them by an arrested aircraft. The tongs rotate the jaws apart when the assembly is depressed into the slot to permit them to reengage the pendant after completion of an arrestment and retraction of the payout lines. The downward movement of the gripping tong assemblies may be resisted by shock absorbers which damp the downward movement of the pendant and allow the tong assemblies to closely follow the upward movement of the pendant after it is bounced downwardly under the wheels of an overrunning aircraft. An efficient shock absorber may comprise a pneumatic piston and cylinder metered by suitable orifices or cushioned by a high hysteresis elastomer. The piston and cylinder may also be used to override the upward resilient bias and to depress the assembly into the slot by admitting compressed air above the piston to push it down. The damping action is enhanced by installing a groove under the pendant into which it is depressed by the overrunning wheels of aircraft, and further improved by installing a slab in the runway under the pendant surfaced with an elastomer, such as polyurethane, having a low coefficient of restitution and high hysteresis in compression.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which.

DESCRIPTION OF THE PREFERRED EMBODIMENTS

FIGS. 1-6

Figure 1:
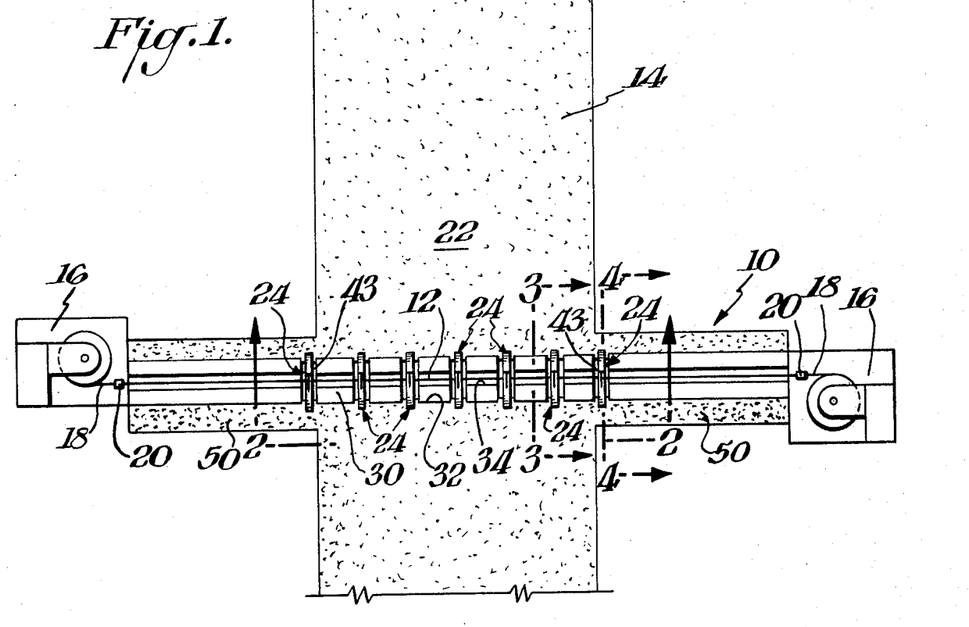
FIG. 1 is a schematic plan view of one embodiment of this invention in conjunction with an airport runway.
Figures 2, 3:
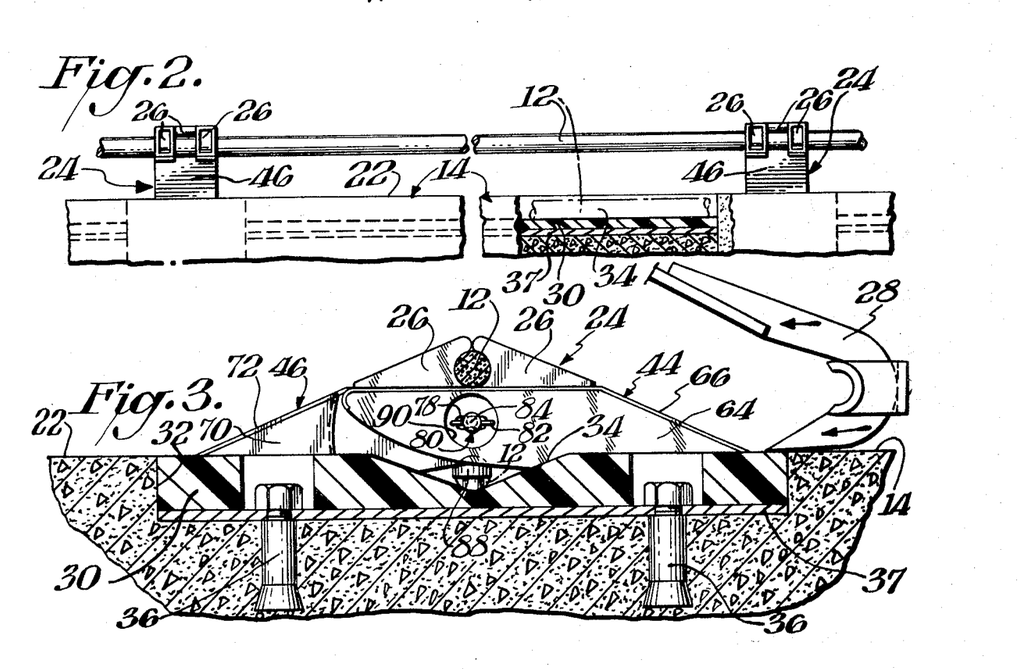
FIG. 2 is a cross-sectional front view in elevation taken through FIG. 1 along the line 2—2.
FIG. 3 is a cross-sectional side view in elevation taken through FIG. 1 along the line 3—3.

In FIGS. 1-3 are shown devices 10 supporting and retaining pendant 12, which extends across airport runway 14 between energy absorbing payout devices 16. Runway 14 is, for example, about 150 to 500 feet wide and devices 10 are spaced about 15 feet apart. On the usual crowned runway, devices 10 are spaced closed towards the raised middle area.

Pendant 12 is for example a wire cable or a nylon braided rope as described in U. S. Pat. No. 3,456,908. Pendant 12 is attached to linear payout element 18 by coupling 20. Payout element 18 is for example, a woven nylon tape. Energy absorber 16 is for example, of the type described in U. S. Pat. No. 3,172,625, which operates in conjunction with a linear tape.

Device 10 is shown in FIGS. 1-3 in its operative or battery position. It holds pendant 12 a short aircraft-arresting height above the surface 22 of runway 14 in a gripping tong assembly 24 having a pair of resilient flexible jaws 26, from which pendant 12 is snatched by hook 28 on an aircraft (not shown) being arrested by pendant 12 and associated apparatus. Hook 28 is, for example, of the type described in U. S. Pat. No. 2,989,272.

Jaws 26 are made of an elastomer, such as polyurethane or neoprene which provides enough stiffness to retain pendant 12 yet permit its rapid disengagement when snatched by hook 28. The elastomer should thus be pliable and not brittle under normal operating conditions and maintains these properties throughout a wide range of severe outdoor runway service conditions including under exposure to strong ultraviolet sunlight. Good abrasion resistance and tear strength are also of significance.

An example of a suitable polymer thus has the following characteristics:

1. Polymer L-100 ADIPRENE, the trademark for a synthetic polyurethane rubber sold by E. I. DuPont DeNemours & Co. having high abrasion resistance, high tensile strength and a low temperature bittle point. It is reaction product of a di-isocyanate and a polyalkalene ether glycol and is an amber solid having a specific gravity of 1.07;
2. Curing agent 4,4'-Methylene-Bis-(2-chloranidine);
3. Mixing Temperature 212°F;
4. Curing Temperature & Time 3 hours at 212°F;
5. Hardness Durometer A-90;
6. Tensile Strength 4,500 p.s.i.;
7. Elongation at Break 50 percent;
8. Tear Strength 85 lb/in (ASTM D-470);
9. Impact Strength (Izod, Notched)-Flexed no fracture;
10. Abrasion Resistance 180 (Bureau of Standards Index)
11. Resilience (Bashore) 39 percent; and
12. Compression Set 27 percent - Method B 22 hours at 158°F.

A slab 30 of an elastomer having a relatively low coefficient of restitution or high hysteresis is mounted within a shallow recess 32 in concrete runway 14 to cooperate in damping the wave motion of pendant 12 when it is bounced downwardly under the wheels of an overrunning aircraft as later described. Slab 30 includes a central longitudinal V-shaped groove 34 for receiving pendant 12 which further improves the damping action of slab 30. Slab 30 is secured within recess 32 by anchor bolts 36 through steel base plate 37 to which slab 30 is bonded. A suitable low resilience, highly abrasion resistant slab having a low coefficient of restitution is made from a polyurethane polymer and suitable curing agent, and an example thereof has the following characteristics and useful ranges.

1. Polymer No. 6005 Polyurethane synthetic rubber from Uniroyal Chemical Company, Naugatuck, Connecticut 06771 - 100 parts by weight;
2. Curing Agent — 4.4 Methylene-bis-(2-chloroaniline) - 95 parts by weight - Percent equivalent (theoretical) 95-98 percent;
3. Mixing Temperature — 212° for 3 hours;
4. Curing Temperature & Time — 212° for 3 hours;
5. Hardness — 70 Durometer A, ranging from 68 to 72.
6. Tensile Strength — 6,000 pounds per square inch, ranging from 5,500 to 6,500;
7. Elongation at Break — 500 percent, ranging from 420 to 580;
8. Tear — 300 pounds ASTM-D-470; ranging from 280 to 320;
9. Impact Strength (IZOD, Notched) Flexed no fracture;
10. Abrasion Resistance, Labor H-18 Wheel — 1,000 gram weight/gram loss 1,000 revolutions — 0.018 ranging from 0.016 to 0.020.
11. Resilience (Bashore) — 8 percent, ranging from 6 to 10 percent; and
12. Compression Set, Method B — 10 percent; ranging from 8 to 10 percent.

Figures 4, 5:
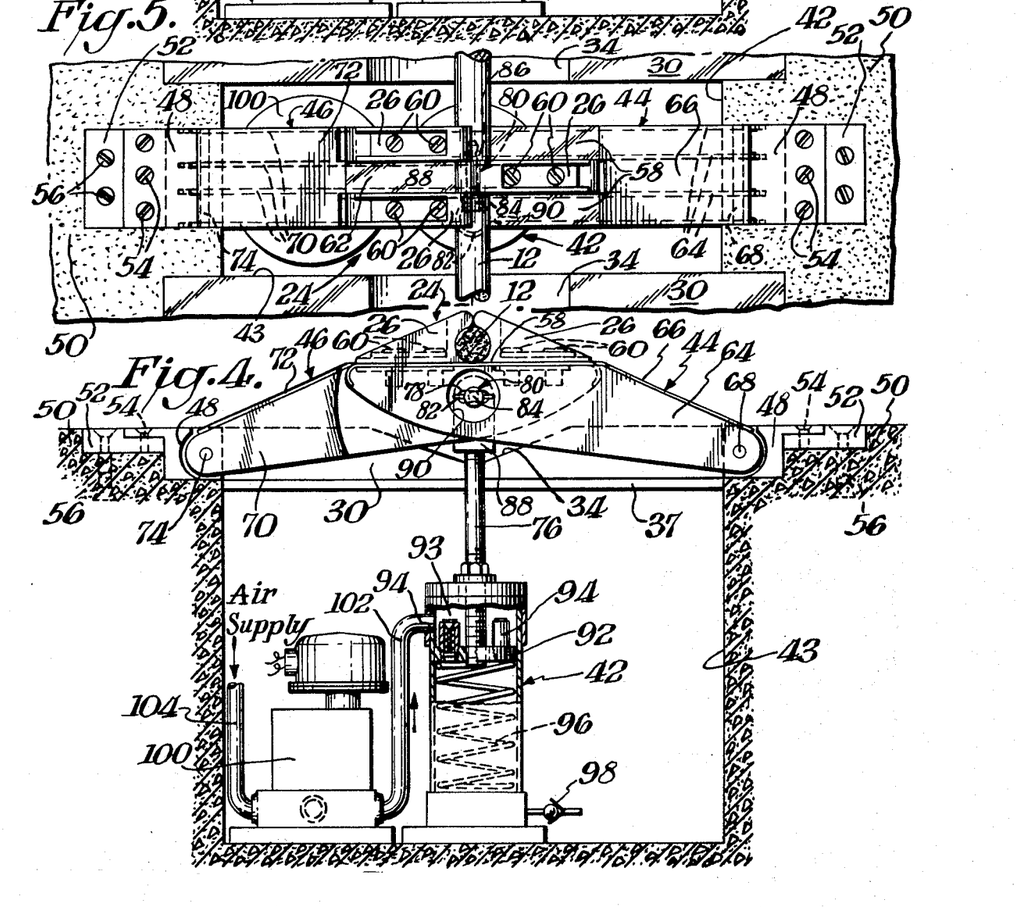
FIG. 4 is a cross-sectional side view taken through FIG. 1 along the line 4—4.
FIG. 5 is a top plan view of the device shown in FIG. 4.
Figure 6:
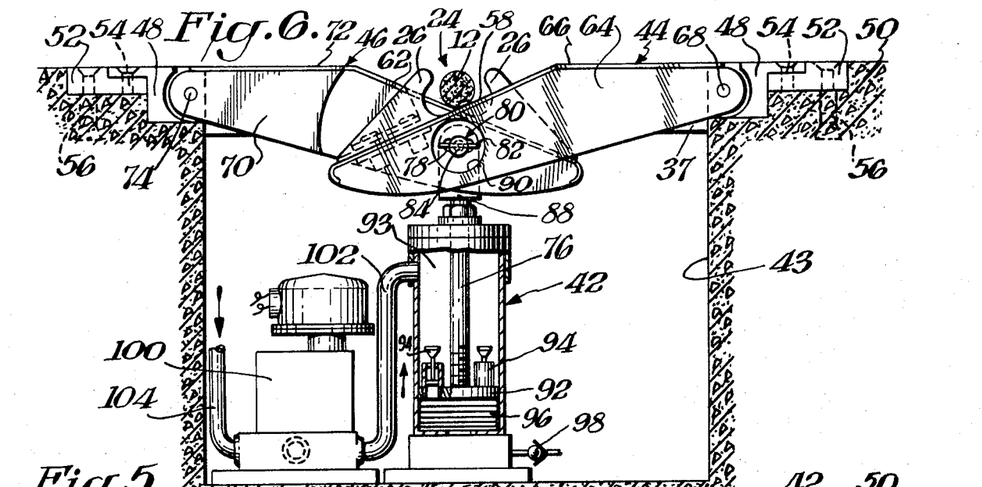
FIG. 6 is a cross-sectional view similar to FIG. 4, but in the depressed disengaged phase of operation.
Figure 7:
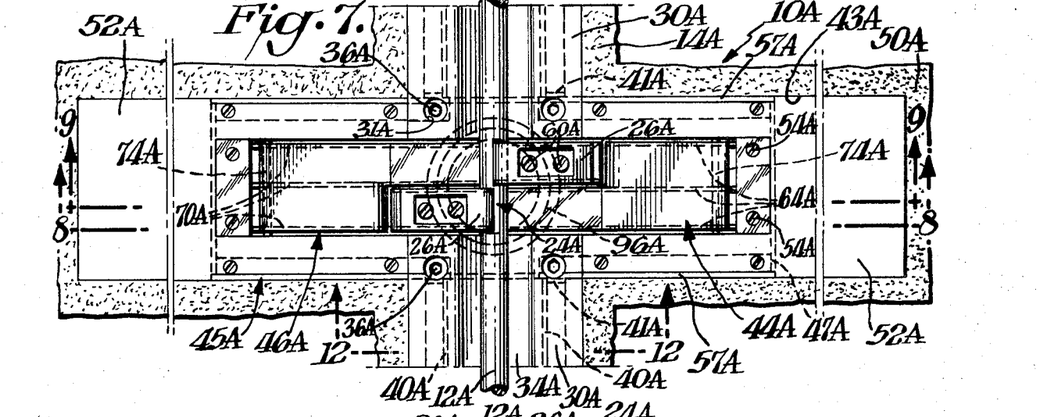
FIG. 7 is a top plan view of a device which comprises another embodiment of this invention.
Figure 8:
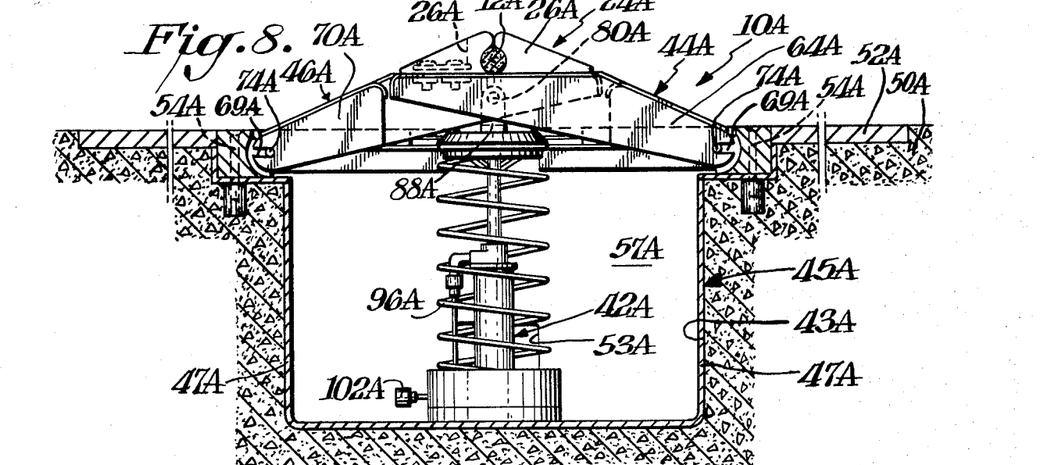
FIG. 8 is a cross-sectional view taken through FIG. 7 along the line 8—8.
Figure 9:
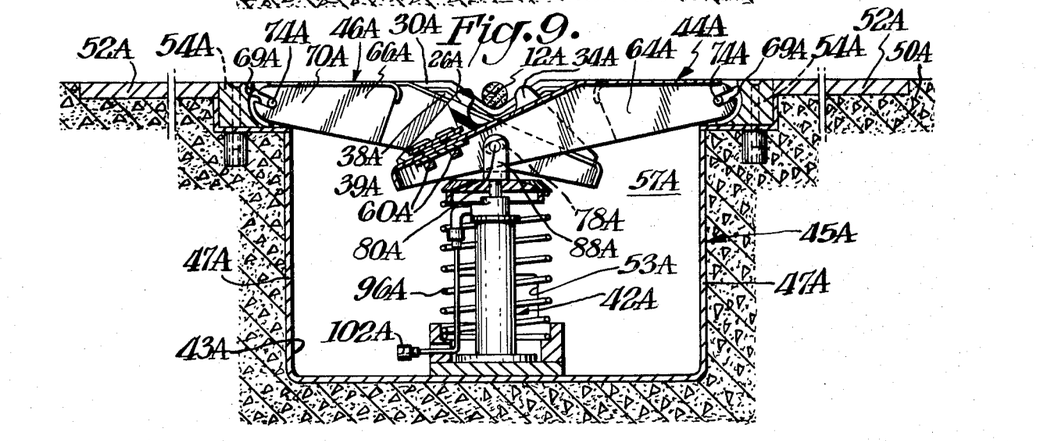
FIG. 9 is another cross-sectional view in elevation through a device as shown in FIG. 7 along the line 9—9 but in the depressed position.

In FIGS. 4 and 5 are shown details of gripping tong assembly 24 and energy-absorbing support 42 mounted within slot 43 on each side of runway 14. Gripping tong assembly 24 is also shown in FIG. 6, in the downward depressed disengaged phase of operation. It includes interfolded arms 44 and 46 pivoted at opposite ends by hinges 48 attached to concrete extension 50 of runway 14. Hinges 48 are secured to anchor plates 52 by cap screws 54, and anchor plates 52 are secured to concrete extension 50 by anchor bolts 56.

Arm 44 has a pair of resilient jaws 26 detachably secured to a pair of parallel fingers 58 by quarter-turn screw fasteners 60. Arm 46 has a single flexible resilient jaw 26 secured to a central finger 62 by similar quarter-turn fastening screws 60. Arm 44 is fabricated of four parallel vertical plates 64 joined by cover plate 66 and rotatably connected to hinge plate 48 by pivot shaft 68. Arm 46 is similarly fabricated of four parallel plates 70 connected by cover plate 72 and rotatably connected to hinge plate 48 by pivot shaft 74.

Gripping tong assembly 24 is connected by piston rod 76 to energy-or shock-absorbing cylinder 42 mounted within slots 43. The top of connecting rod 76 is connected to slotted holes 78 through fingers 58 and 62 by removable locking pin 80 having a grasping ring 82 secured to shoulder 84 and a removable snap ring 86 on the other end. Connecting fork 88 is secured about the central pairs of plates 70 of arm 46 and 64 of arm 44. Access holes 90 in outer plates 64 of arm 44 facilitate installation and removal of pin 80.

Within energy-absorbing cylinder 42 is installed piston 92 on the end of connecting rod 76. A pair of check valves 94 are installed in piston 92 to permit air to pass upwardly through it when it is moved downwardly. Check valves 94 have suitable orifices or passageways to meter the downward motion of piston 92 against the force of compression spring 96 under it and thus absorb energy and damp the waves set up in pendant 12. Check valve 98 in the bottom of cylinder 42 prevents air from being discharged from cylinder 42 when piston 92 moves down but allows air to reenter the space under piston 92 on its upward movement. Control valve 100 is connected to air line 102, which is connected to the portion of cylinder 42 above piston 92. An air compressor (not shown) is connected to compressed air supply line 104, which is connected to the input side of control valve 100. Control valve 100 is for example an electrical solenoid controlled valve having two positions. One position is designed "pressure" and it connects the compressed air supply to space 93 above piston 92 to depress it. The other position is designated "exhaust" and it connects upper space 93 to atmosphere when device 10 is in its shock-absorbing operational phase. The supply position is used for overriding and depressing energy absorber 42. The compressed air admitted in the supply position moves piston 92 and gripping tong assembly 24 into the downward disengaged position shown in FIG. 6.

The ready or battery position of device 10 is shown in FIG. 1-5 in which pendant 12 is held a short distance above the surface 22 of runway 14 for engagement by hook 28 (shown in FIG. 3) of an aircraft to be arrested. Hook 28 snatches pendant 12 from between flexible resilient jaws 26 of gripping tong assemblies 24 deployed across runway 14. Resilient, flexible jaws 26 may easily be replaced if they become distorted or worn because quarter-turn fastening screws 60 facilitate rapid removal and replacement.

After the aircraft is completely arrested by payout elements 18 and energy-absorbing pay out devices 16, lines 18 are rewound or retracted by energy-absorbing payout devices 16. Pendant 12 then reassumes the position shown in FIG. 1. Prior to this retraction, assemblies 24 are depressed into slots 43 by actuating solenoid control valve 100 to admit compressed air into space 93 above piston 92. This forces piston 92 downwardly against compression spring 96 to carry connecting rod 76 and gripping tong assemblies 24 into slots 42 below the surface 22 of runway 14 as shown in FIG. 6. This places assemblies 24 in position for rapid automatic reengagement with pendant 12, thus facilitating highly desirable rapid recycling of the aircraft arresting system. Device 10 accordingly automatically reengages pendant 12 and carries it back into the ready position when control valve 100 is actuated to the exhaust position, which allows compression spring 96 to return piston 92 upwardly to the position shown in FIG. 4. Device 10 therefore reengages pendant 12 without any manual handling or necessity to forceably insert pendant 12 back into it.

When normal unarrested aircraft traffic rolls over pendant 12 held in the ready or battery position shown in FIG. 1-5, the energy absorption of shock or energy absorber 42 in conjunction with groove 34 in low resilience slab 30 damps the drastic wave motion set up in pendant 12. Shock absorber 42 is adjustable to maximize this damping action by variation of the orifices of check valves 94 together with the characteristics of compression spring 96. Shock absorber 42 is thus turned to the dampened motion of pendant 12 to cause assemblies 24 to closely follow the upward movement of pendant 12 and maintain it engaged in the ready position between resilient jaws 26. This damping action in conjunction with the protection of concrete runway 14 by slab 30 eliminates the severe erosion, chipping and spalling of concrete runway 14 heretofore experiences with existing pendant supporting devices.

FIGS. 7-12

Device 10A is similar to device 10 with certain exceptions. Gripping tong assembly 24A includes a pair of single arms 44A and 46A instead of the former double arm 44. The pivoted ends of arms 44A and 46A also differ in that they include slots 69A to facilitate rapid installation and removal from pivots 74A. Compression spring 96A is mounted around cylinder 42A instead of within it. This permits the size of cylinder 42A to be minimized, but it is in all other respects similar in structure and function to cylinder 42. Yoke 88A is also simplified relative to fork 88 of FIGS. 3-6 and merely bridges under adjacent vertical plates 64A and 70A of arms 44A and 46A to which it is connected by removable pin 80A through slot 78A.

Figure 10:
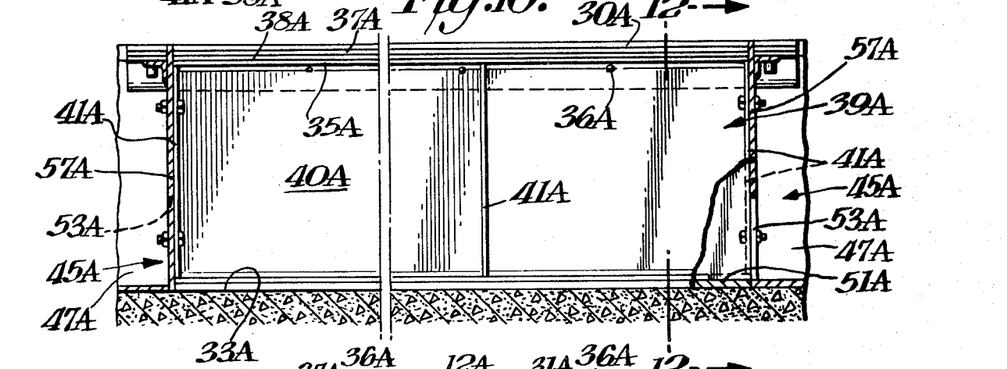
FIG. 10 is a cross-sectional view in elevation taken through FIG. 11 along the line 10—10.
Figure 11:
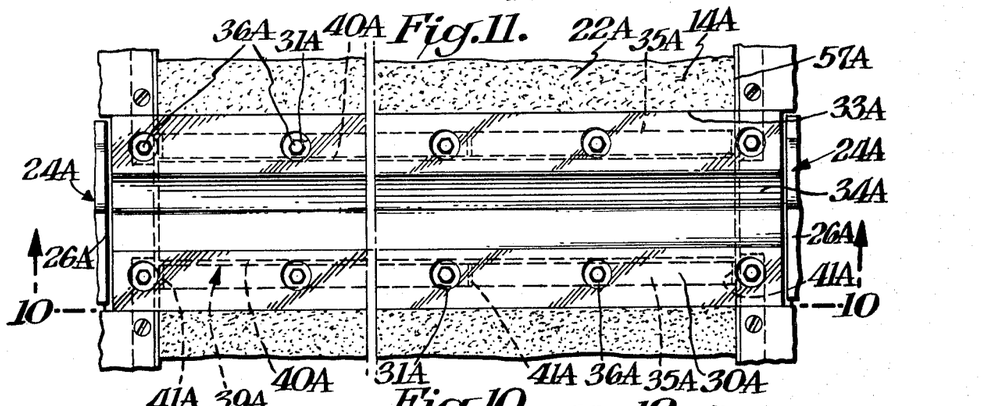
FIG. 11 is a top plan view of the cross runway trough boxes underlying lengths of the pendant between devices 10A as shown in FIG. 7.
Figure 12:
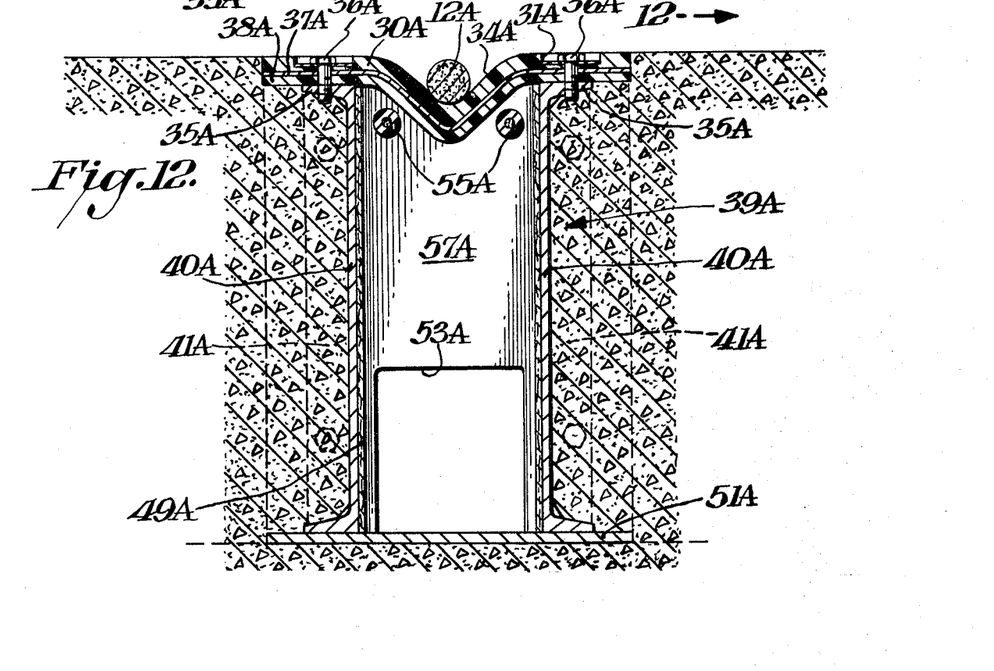
FIG. 12 is a cross-sectional view taken through FIGS. 7 and 10 along the lines 12—12.

FIGS. 10-12 show cross runway trough box 39A bridging the portions of the runway between slots 43A. The tops of boxes 39A are covered by slabs 30A of elastomeric material similar in function to slab 30. Slab 30A is however of uniform thickness and is bonded to a centrally channeled base plate 37A instead of straight base plate 37 shown in FIG. 3. The bonded assembly of slab 30A and base plate 37A is secured by cap screws 36A to lid 38A and upper flanges 35A of side channels 40A of boxes 39A. Cap screws 36A extend through countersunk recesses 31A in slabs 30A to firmly secure them to trough boxes 39A.

Trough boxes 39A are constructed of base plates 51A and side channels 40A secured to side wall 57A of slot lining 45A. Connecting apertures 53A extend through the bases of side walls 57A to drain water from slots 43A outwardly away from centrally crowned runway 14A (not shown). Heaters 55A in the top of boxes 39A heat V-shaped depressions 34A in slabs 30A, base plates 37A and lids 38A for melting any ice or snow which would interfere with full depression of pendant 12A. The sides of boxes 39A are braced by vertical ribs 41A. Drainage and maintenance of heaters 55A and pendant-receiving elastomeric slabs 30A are remarkably facilitated by boxes 39A and their removable lids 38A.

Figure 13:
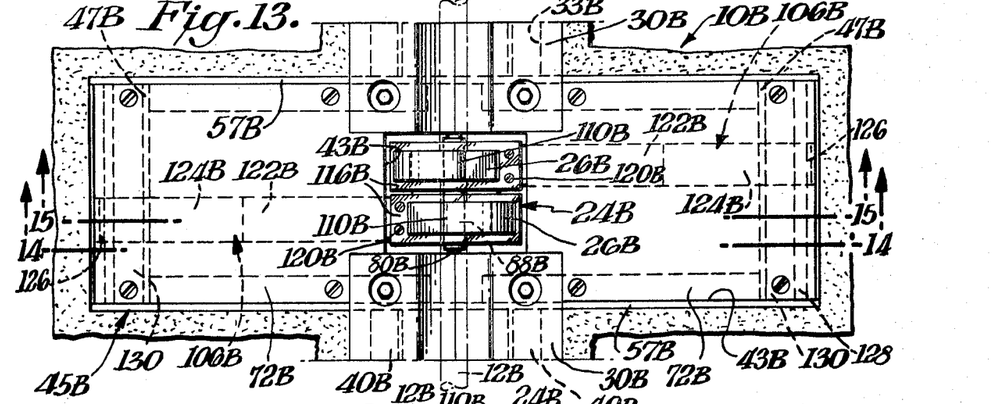
FIG. 13 is a top plan view of a device which is a further embodiment of this invention.
Figure 14:
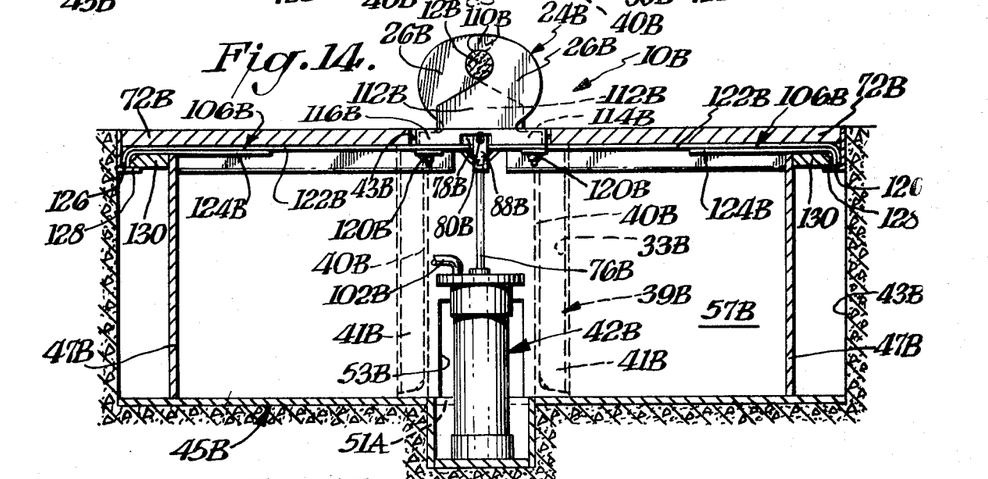
FIG. 14 is a cross-sectional view taken through FIG. 13 along the line 14—14.
Figure 15:
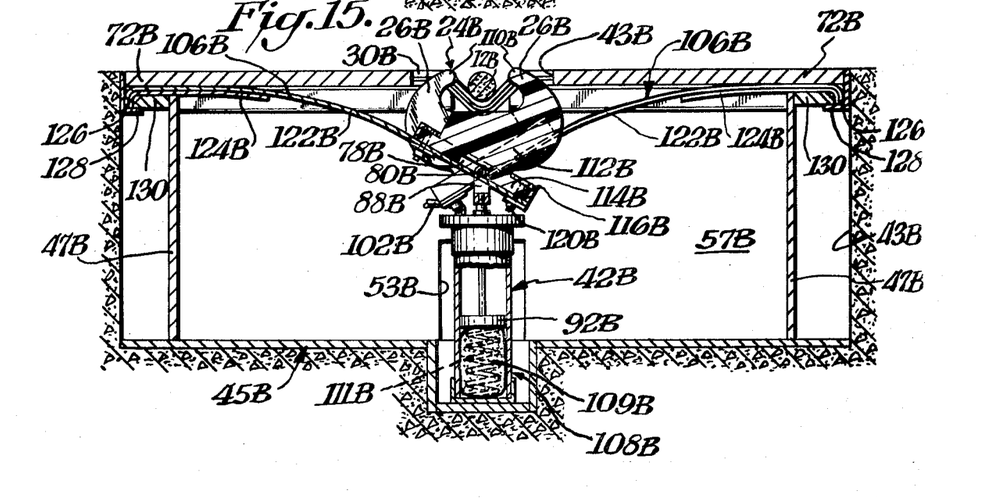
FIG. 15 is another cross-sectional view in elevation taken through a device as shown in FIG. 13 along the line 15—15 but in the depressed position.

FIGS. 13-15

Device 10B is another form of this invention, which primarily differs from devices 10 and 10A in that the resilient support for biasing gripping tong assembly 24B upwardly is provided by a pair of leaf spring arms 106B instead of auxiliary springs 96 and 96A reacting on cylinder 42A. Flexible jaws 26B are also larger than jaws 26 and 26A and are directly mounted on leaf spring arms 106B, as later described in detail. Insulation 49A is installed against inside surface of wall 40A of box frame 39A.

Another difference is the provision of shock absorption in cylinder 42B by the disposition of energy-absorbing material 108B under piston 92B instead of the former metering orifices within the piston. Such energy-absorbing material 108B should, for example, be a composite material 108B having very high compressibility and high hysteresis in compression. A suitable type of such material could utilize a low density plastic foam 109B (polyethylene) and for high compressibility together with an auxiliary elastic substance having sufficient memory to return to the original dimension. This elastic memory element could, for example, be a weak metallic coil spring 111B embedded within the foam or any type of weak spring such as longitudinal rubber bars.

Resilient jaws 26B are similar to each other and comprise hooked tips 110B extending from trunks 112B on flanged bases 114B, which are secured to leaf spring arms 106B by flanged retaining collars 116B. Jaws 26B are firmly retained on spring arms 106B under collars 116B secured by screw and nut assemblies 120B. Leaf spring arms 106B each include a main leaf spring 122B and a shorter supporting leaf spring 124B, each having a bent outer end 126B secured between cover plate 72B, lip angle 128B and flanges 130B attached to end walls 47B of slot lining 45B.

Piston rod 76B is attached to gripping tong assembly 24B by yoke 88B which bridges the space under jaws 26B. Pin 80B connects yoke 88B to slots 78B in the center of bases 114B of jaws 26B. Air line 102B admits air above piston 92B to override spring arms 106B and depress gripping tong assembly 24B into slot 43B as shown in FIG. 15. This releases jaws 26B from engagement with pendant 12B and permits it to be automatically reinserted in them after payout and retrieval in the manner previously described. The damping action of the polyurethane foam insert 108B under piston 92B is similar in result to that previously described. The porosity and density of foam insert 108B is varied to suit particular requirements.

Figure 16:
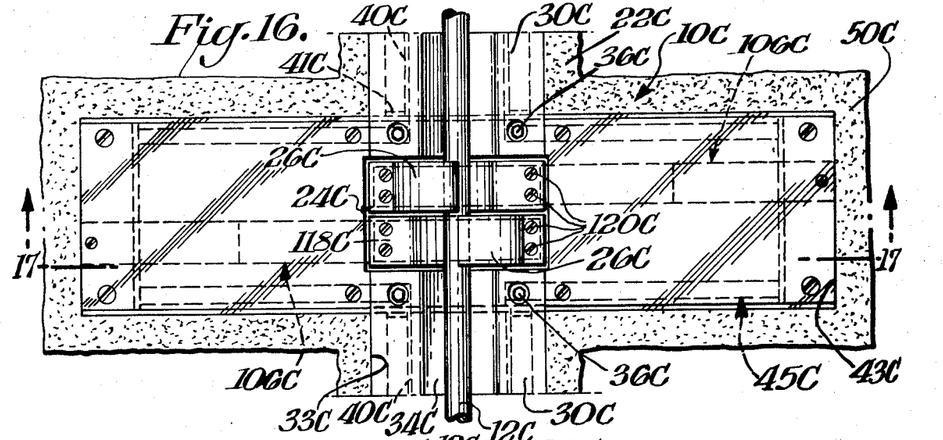
FIG. 16 is a top plan view of a device which is a still further embodiment of this invention.
Figure 17:
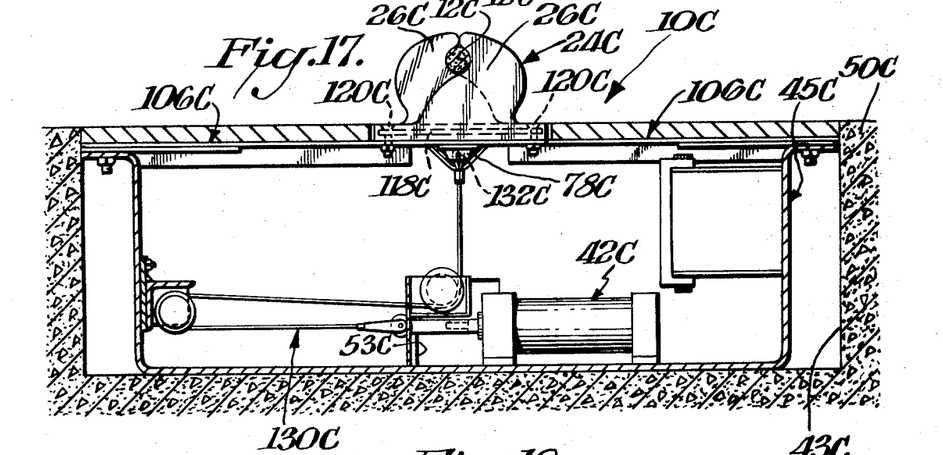
FIG. 17 is a cross-sectional view taken through FIG. 16 along the line 17—17.
Figure 18:
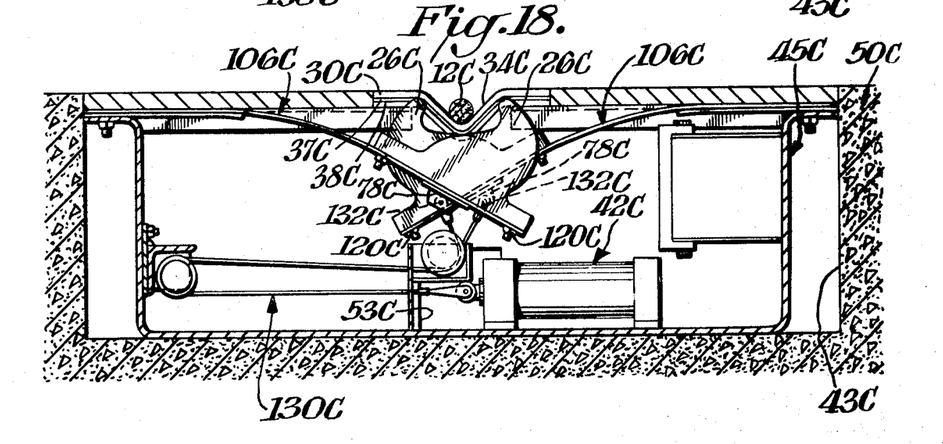
FIG. 18 is another cross-sectional view in elevation taken through the device shown in FIG. 16 along the line 17—17 but in the depressed position.

FIGS. 16–18

Device 10C is similar to device 10B with the exception that cylinder 42C is merely used for overriding springs 106B and does not provide any shock absorbing or damping function. Piston 42C is accordingly mounted horizontally in the bottom of slot 43C and is connected separately to each of jaws 26C by a pair of cable and pulley assemblies 130C having connecting loops 132C attached to brackets 78C on springs 106C under jaws 26C. Actuation of cylinder 42C by compressed air forces piston 92C (not shown) to the right from the position shown in FIG. 17 to that shown in FIG. 18. This depresses gripping tong assembly 24C within slot 43C in the same manner and with the same results previously discussed. When the wheels of unarrested aircraft roll over pendant 12C in the position shown in FIG. 17, pulley and cable assemblies 130C merely slacken to allow free depression and rapid rebound of gripping tong assembly 24C and pendant 12C. Metal stiffening plates 118C are imbedded within flanged bases 114C to help screw and nut assemblies 120C firmly secure jaws 26C on spring arms 106C.

I claim:

1. A pendant supporting and retaining device for an aircraft arresting system installed across an airport runway comprising a slot in the side of said runway under said pendant, a disengageable elevating gripping tong assembly mounted in said slot for movement from positions above to below the surface of said runway, flexible resilient jaws on top of said assembly for engaging said pendant and holding it a short distance above said runway in aircraft arresting position, said flexible resilient jaws permitting forceable disengagement of said pendant when it is snatched by an aircraft to be arrested, said assembly and said jaws being constructed and arranged to disengage from about said pendant when said assembly is moved below said surface, a resilient support reacting between said assembly and said runway to urge said assembly upwardly above said surface whereby said pendant is resiliently maintained in said aircraft arresting position and depresses under the wheels of unarrested aircraft while engaged in said assembly, and overriding means connected to said assembly for depressing it into said slot to release said pendant.

2. A pendant supporting and retaining installation for an aircraft arresting system installed across an airport runway comprising a plurality of devices as set forth in claim 1 spaced from each other at suitable distances for efficiently supporting and retaining said pendant.

3. A device as set forth in claim 1 wherein an energy-absorbing support is disposed in said slot, and a connecting rod from said assembly to said shock-absorbing support whereby said shock-absorbing support damps wave motion and vibration set up in said pendant by unarrested aircraft traffic.

4. A device as set forth in claim 1 wherein said energy-absorbing support comprises a resilient piston and cylinder.

5. A device as set forth in claim 4 wherein said resilient piston and cylinder comprises a compression spring between said piston and the portion of said cylinder remote from said assembly, and a fluid pressure receiver between the other side of said piston and said cylinder wherein fluid pressure is admitted for overriding said piston and forcing it downwardly against said spring to compress it and depress said assembly into said slot to release said pendant.

6. A device as set forth in claim 5 wherein said piston and cylinder comprises a pneumatic piston and cylinder, and a spring in said cylinder biasing said piston upwardly.

7. A device as set forth in claim 6 wherein check valves are installed in said piston to permit a metered amount of air to pass through said piston on the downward movement whereby said damping is provided.

8. A device as set forth in claim 1 wherein said gripping tong assembly comprises a pair of aligned arms disposed parallel to said runway with central portions overlapping, pivots rotatably mounting the remote ends of said arms in said slot whereby said jaws move from a closed position engaging said pendant in said elevated aircraft arresting position to an open position releasing said pendant when said assembly is depressed into said slot below said runway surface.

9. A device as set forth in claim 8 wherein one of said arms is forked with two fingers extending toward the other, the other arm is disposed in loose interlocking insertion between said fingers, a pair of said jaws being mounted on said fingers and one of said jaws being mounted on said other arm.

10. A device as set forth in claim 1 wherein said flexible resilient jaws are elastomeric.

11. A device as set forth in claim 10 wherein the said elastomer is polyurethane.

12. A device as set forth in claim 1 in combination with a groove in said runway under said pendant wherein said pendant is received when said assembly is depressed into said slot.

13. A device as set forth in claim 1 in combination with a slab of a material having a low coefficient of restitution inserted in the surface of said runway under said pendant for helping to damp said wave motion and vibration of said pendant.

14. A device as set forth in claim 13 in combination with a groove in said runway under said pendant wherein said pendant is received when said linkage is depressed into said slot.

15. A device as set forth in claim 14 wherein said slab is a polyurethane having a low resilience and a high abrasion resistance.

16. A device as set forth in claim 4 wherein an energy-absorbing material is disposed in said cylinder whereby energy is absorbed from said piston when it moves downwardly to compress said material within said cylinder.

17. A device as set forth in claim 16 wherein said material is a resilient plastic foam.

18. A cross runway slab disposed under a pendant installed across an airport runway in an aircraft arresting system comprising a slab of polyurethane having a relatively low coefficient of restitution, high abrasion and high wear resistance whereby wave motion and vibration of said pendant are damped and said runway is protected.

19. A slab as set forth in claim 18 wherein said polyurethane has a resilience (Bashore) ranging approximately from 6 to 10 percent.

20. A slab as set forth in claim 18 wherein a central longitudinal indentation is disposed in said slab for receiving said pendant.

21. A pendant supporting and retaining device for an aircraft arresting system installed across an airport runway comprising a slot in the side of said runway under said pendant, a disengageable elevating gripping tong assembly mounted in said slot for movement from positions above to below the surface of said runway, resilient jaws on said assembly for engaging said pendant and holding it a short distance above said runway in aircraft arresting position, said resilient jaws permitting forceable disengagement of said pendant when it is snatched by an aircraft to be arrested, an energy-absorbing support in said slot, a connecting rod from said assembly to said energy-absorbing support, resilient means reacting between said runway and said assembly whereby said assembly is resiliently urged upwardly above said surface for holding said pendant in said aircraft arresting position and said energy-absorbing support being constructed and arranged for damping wave motion and vibration set up in said pendant by unarrested aircraft traffic.

22. A device as set forth in claim 21 wherein said energy-absorbing support comprises a piston and cylinder.

23. A device as set forth in claim 22 wherein said piston and cylinder also comprises a compression spring reacting against said connecting rod.

24. A device as set forth in claim 23 wherein said spring is disposed within said cylinder and reacts upwardly against said piston.

25. A device as set forth in claim 22 wherein check valves are installed in said piston to permit a metered amount of air to pass through said piston on the downward movement whereby said damping is provided.

26. A device as set forth in claim 23 wherein said compression spring is disposed inside said cylinder.

27. A device as set forth in claim 23 wherein said compression spring is disposed around said cylinder.

28. A device as set forth in claim 22 wherein a material having a low coefficient of restitution is disposed within said cylinder for absorbing energy to help damp said wave motion.

29. A device as set forth in claim 28 wherein said material comprises a composite material including a low density resilient foam and a weak spring element.

30. A device as set forth in claim 29 wherein said low density resilient foam comprises an open cell plastic foam.

* * * * *